United States Patent
Tochiyama

[11] Patent Number: 5,860,206
[45] Date of Patent: Jan. 19, 1999

[54] METHOD OF FIXING SUSPENSION TO ACTUATOR ARM

[75] Inventor: Kazunori Tochiyama, Kawasaki, Japan

[73] Assignee: Fujitsu Limited, Kawasaki, Japan

[21] Appl. No.: 788,173

[22] Filed: Jan. 24, 1997

[30] Foreign Application Priority Data

Jun. 12, 1996 [JP] Japan .................................. 8-150562

[51] Int. Cl.⁶ ...................................................... G11B 5/42
[52] U.S. Cl. ...................................... 29/603.04; 360/104
[58] Field of Search ........................ 29/603.04, 603.05, 29/603.06, 603.03, 515; 360/103–106

[56] References Cited

U.S. PATENT DOCUMENTS

| | | |
|---|---|---|
| 3,329,379 | 7/1967 | Solyst ............................. 29/603.04 X |
| 4,796,122 | 1/1989 | Levy et al. . |
| 4,829,325 | 5/1989 | Iwasawa et al. . |
| 4,870,525 | 9/1989 | Wong et al. . |
| 5,262,911 | 11/1993 | Cain et al. ....................... 29/603.03 X |

*Primary Examiner*—Carl E. Hall
*Attorney, Agent, or Firm*—Greer, Burns & Crain, Ltd.

[57] ABSTRACT

A method of fixing a suspension to an actuator arm having a mounting portion. The mounting portion has a first hole and a second hole formed in proximity to the first hole. The suspension has a cylindrical projection having an outer diameter slightly smaller than the diameter of the first hole. The cylindrical projection is first inserted into the first hole of the mounting portion of the actuator arm, and a ball having a diameter slightly larger than the diameter of the second hole of the mounting portion of the actuator arm is next forcibly passed through the second hole. Accordingly, the second hole is radially expanded to deform a wall portion defining the first hole, thereby forcibly pressing the cylindrical projection on the mounting portion of the actuator arm to fix the suspension to the actuator arm.

14 Claims, 12 Drawing Sheets

METHOD OF FIXING SUSPENSION TO ACTUATOR ARM

BACKGROUND OF THE INVENTION

1. Field of the Invention

The present invention relates to a method of fixing a suspension to an actuator arm in a disk drive, and also to an actuator arm assembly manufactured by using the fixing method.

2. Description of the Related Art

In a recent magnetic disk drive as a kind of external storage device for a computer, size reduction and thickness reduction have proceeded, and low power consumption has also been desired. Further, to increase the storage capacity, an increase in recording density of a magnetic disk (hard disk) is required and the number of magnetic disks mounted in the disk drive is also increasing.

In a magnetic disk drive for a computer, a contact start and stop (CSS) system is generally adopted as the relation between a magnetic head and a magnetic disk. In this system, the magnetic head is kept flying a microscopic height from the magnetic disk during rotation of the disk owing to the balance between a flying force generated by air flow due to high-speed rotation of the disk and a pressing force of a suspension for pressing the head on the disk. When the rotation of the disk is stopped, the head is moved to a contactable zone on the disk and next comes into contact with the disk at the contactable zone. In the rest condition of the disk, the head is kept in contact with the disk.

The magnetic head is supported on the suspension at its front end. The suspension is fixed at its base end portion through a spacer to the front end of an actuator arm. That is, the base end portion of the suspension is spot-welded to the spacer, and the spacer is fixed by crimping to the front end of the actuator arm, thereby fixing the suspension to the front end of the actuator arm.

As a method of fixing the spacer to the front end of the actuator arm by crimping, it is known to pass a crimping ball through a cylindrical projection formed on the spacer to thereby expand the cylindrical projection, thus crimping the spacer to a hole of the actuator arm. In carrying out this crimping work, the spacer is pressed by a jig to prevent deformation of the spacer surface due to a crimping force. However, in such a conventional method of fixing the spacer by crimping, there is a tendency that the spacer is recessed on the upstream side (upper side) in the direction of passing of the crimping ball and is projected on the downstream side (lower side) in this direction.

As a result, twisting or warping of the spacer is apt to occur, causing an adverse effect on flying characteristics of the head. Such an uneven surface of the spacer causes variations in connecting force between the suspension and the actuator arm, which causes possible fluctuations in vibration characteristics of the suspension. Further, since the spacer is mass-produced by drawing, it is difficult to ensure the accuracy of the bore of the cylindrical projection through which the crimping ball is passed.

SUMMARY OF THE INVENTION

It is therefore an object of the present invention to provide a method of fixing a suspension to an actuator arm which can suppress twisting and warping of the suspension to suppress fluctuations in flying height of a head.

It is another object of the present invention to provide an actuator arm assembly which can improve a connecting force between a suspension and an actuator arm to improve the vibration characteristics of the suspension.

In accordance with an aspect of the present invention, there is provided a method of fixing a suspension to an actuator arm, comprising the steps of preparing a mounting portion of the actuator arm, the mounting portion having a first hole and a second hole formed in proximity to the first hole; preparing a base end portion of the suspension, the base end portion having a cylindrical projection insertable into the first hole; inserting the cylindrical projection into the first hole; and passing a ball having a diameter larger than a diameter of the second hole through the second hole to radially expand the second hole, thereby deforming a wall portion defining the first hole to forcibly press the cylindrical projection on the mounting portion.

According to the present invention, the ball is forcibly passed through the second hole to radially expand the second hole. As a result, the wall portion defining the first hole is deformed to thereby crimp the cylindrical projection of the suspension to the mounting portion of the actuator arm. Accordingly, twisting and warping of the suspension can be suppressed to improve the flying characteristics of the head.

In accordance with another aspect of the present invention, there is provided an actuator arm assembly of a disk drive having a base, comprising an actuator arm rotatably mounted on the base, the actuator arm having one end portion formed with a first hole and a second hole located in proximity to the first hole; and a suspension having one end portion formed with a cylindrical projection and the other end portion supporting a head, the cylindrical projection being inserted in the first hole and fixed to the one end portion of the actuator arm by forcibly passing a ball through the second hole.

In accordance with still another aspect of the present invention, there is provided a method of removing a suspension of an actuator arm assembly comprising an actuator arm rotatably mounted on a base of a disk drive, the actuator arm having one end portion formed with a first hole and a second hole located in proximity to the first hole, and a suspension having one end portion formed with a cylindrical projection and the other end portion supporting a head, the cylindrical projection being inserted in the first hole and fixed to the one end portion of the actuator arm by forcibly passing a ball through the second hole, the method comprising the steps of forcibly passing another ball through a bore of the cylindrical projection fixed in the first hole to relax deformation of the first hole; and removing the suspension from the actuator arm.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
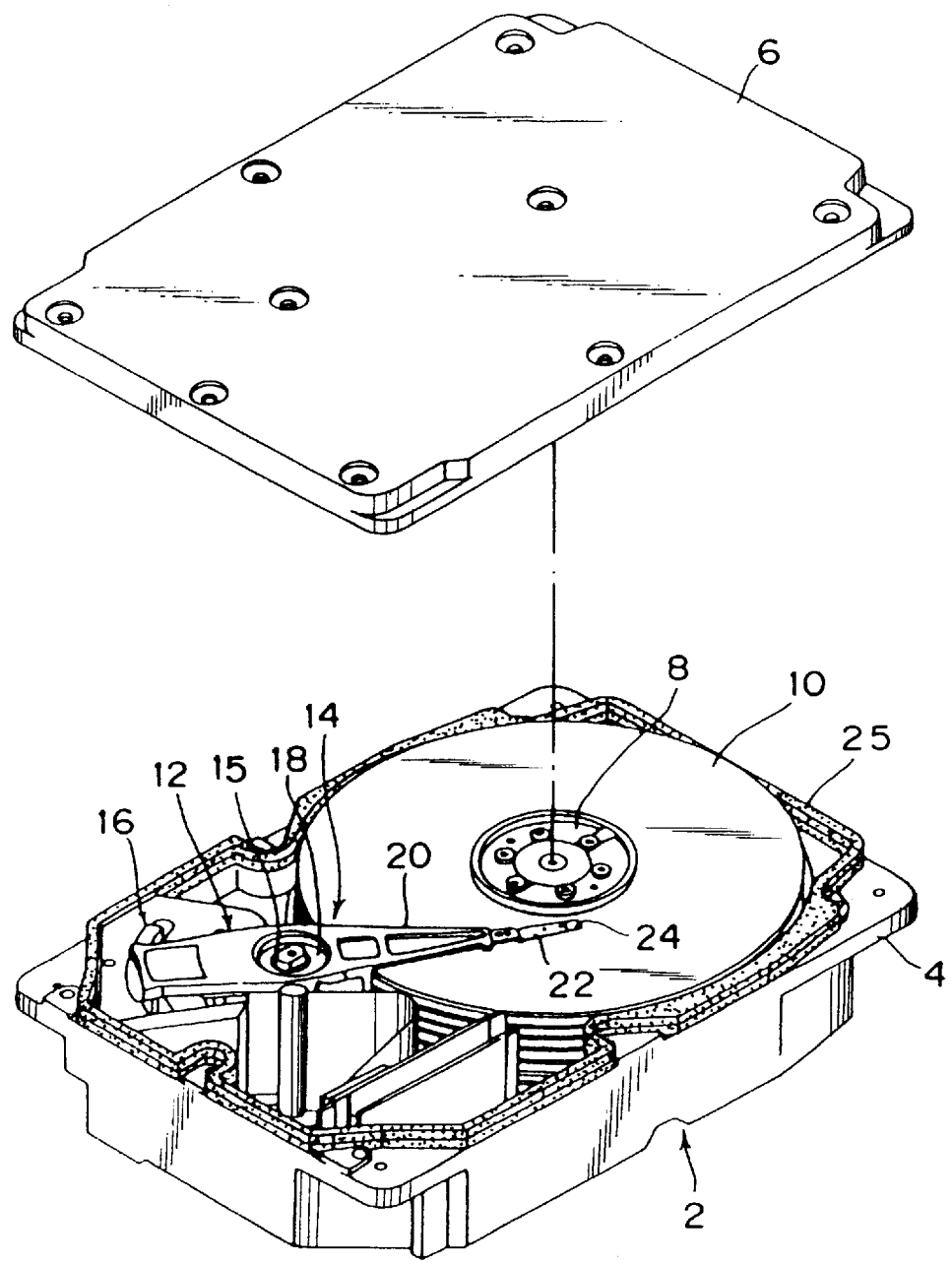
FIG. 1 is a perspective view of a magnetic disk drive employing the actuator arm assembly of the present invention.

Referring to FIG. 1, there is shown a perspective view of a magnetic disk drive employing the actuator arm assembly of the present invention. Reference numeral 2 denotes a housing (disk enclosure) composed of a base 4 and a cover 6. A spindle hub (not shown) to be rotatably driven by an inner hub motor (not shown) is provided on the base 4. A plurality of magnetic disks 10 and spacers (not shown) are alternately stacked and mounted on the spindle hub. That is, the plurality of magnetic disks 10 are regularly spaced from each other by the spacers and are fixedly mounted on the spindle hub by securing a disk clamp 8 to the spindle hub by means of screws.

Reference numeral 12 denotes a rotary actuator assembly composed of an actuator arm assembly 14 and a magnetic circuit 16. The actuator arm assembly 14 includes an actuator block 18 rotatably mounted on a shaft 15 fixed to the base 4. The actuator block 18 is integrally formed with a plurality of actuator arms 20. A suspension 22 is fixed at its base end portion to a front end portion of each actuator arm 20 by a method to be hereinafter described, and a magnetic head 24 is mounted on a front end portion of each suspension 22. Reference numeral 25 denotes an annular packing for sealing the housing of the magnetic disk drive.

Figure 4:
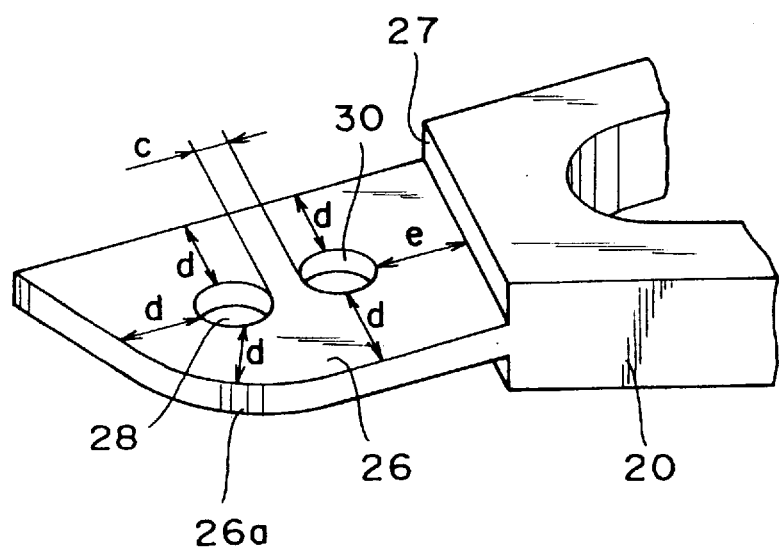
FIG. 4 is a perspective view showing dimensions of the mounting portion of the actuator arm.

A fixing method for the suspension according to a first preferred embodiment of the present invention will now be described with reference to FIGS. 2A to 5. The actuator arm 20 has at its front end a mounting portion 26 for mounting the suspension 22. The mounting portion 26 is formed with a hole 28 for positioning the suspension 22 and a hole 30 for passing a crimping ball 32. The holes 28 and 30 are located in proximity to each other. The actuator arm 20 is formed of aluminum or aluminum alloy. As shown in FIG. 4, letting c denote the thickness of a wall portion 29 between the hole 28 and the hole 30, d denote the distance from each of the holes 28 and 30 to an edge 26a of the mounting portion 26, and e denote the distance between the hole 30 and a shoulder 27, the relations of c<d and c<e are satisfied. Further, the suspension positioning hole 28 and the ball passing hole 30 must be located in proximity to each other.

Figure 5:
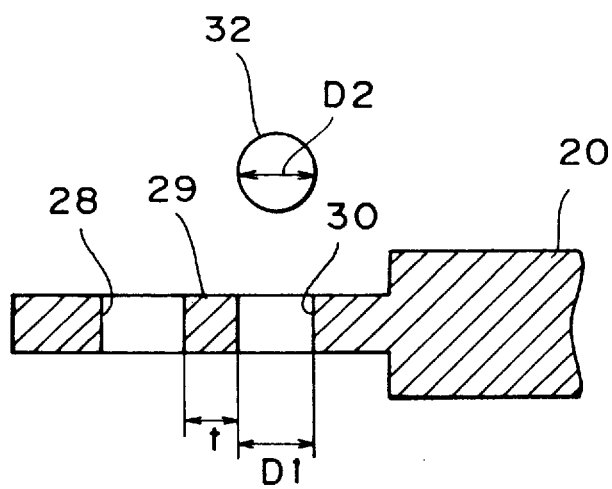
FIG. 5 is a sectional view showing dimensions of the mounting portion.

Referring to FIG. 5, letting t denote the thickness of the wall portion 29 between the hole 28 and the hole 30, D1 denote the diameter of the ball passing hole 30, and D2 denote the diameter of the ball 32, the relation of 0<D2−D1<t is satisfied. For example, the diameter D1 of the hole 30 is 1.80 to 1.85 mm, the diameter D2 of the ball 32 is 2 mm, and the thickness t of the wall portion 29 is 0.3 mm. The diameter of the suspension positioning hole 28 is 2 mm, for example.

Referring again to FIGS. 2A and 3, a cylindrical projection 34 is formed at the base end portion of the suspension 22, and the magnetic head 24 is mounted on the front end portion of the suspension 22. The suspension 22 is formed of stainless steel. The cylindrical projection 34 of the suspension 22 is inserted into the hole 28 to position the suspension 22. The ball 32 is next forcibly passed through the hole 30 in a direction depicted by an arrow A shown in FIG. 2A. The ball 32 is formed of steel.

Figure 2A:
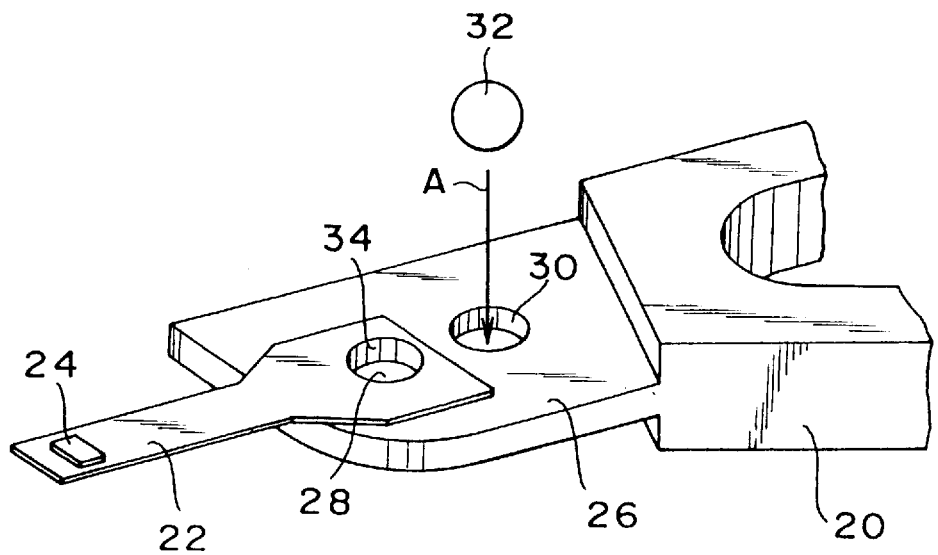
FIG. 2A is a perspective view showing a condition before passing a ball through a hole of a mounting portion of an actuator arm.
Figure 2B:
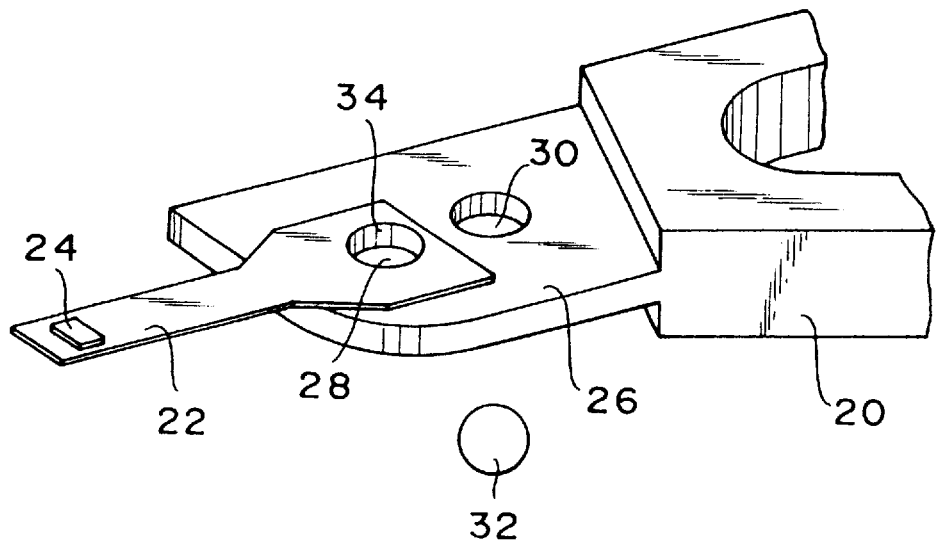
FIG. 2B is a view similar to FIG. 2A, showing a condition after passing the ball through the hole.
Figure 3:
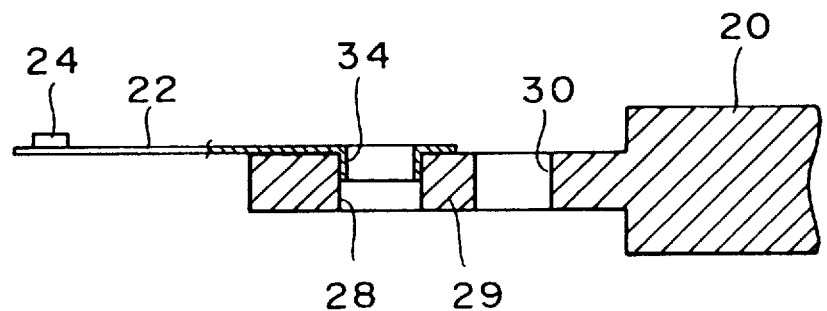
FIG. 3 is a sectional view of a first preferred embodiment of the present invention.

Since the ball 32 has a diameter larger than that of the hole 30, the hole 30 is radially expanded by the pass of the ball 32. As a result, a wall portion defining the hole 28, mainly, the wall portion 29 between the hole 28 and the hole 30 is deformed to thereby forcibly press the cylindrical projection 34 of the suspension 22 on the inner surface of the hole 28 of the mounting portion 26 of the actuator arm 22, thus crimping the suspension 22 to the mounting portion 26 of the actuator arm 20. FIG. 2B shows a condition after the ball 32 has been passed through the hole 30. In the case that the diameter of the hole 28 is 2 mm, it is suitable that the outer diameter of the cylindrical projection 34 is 1.8 to 1.9 mm and the inner diameter of the cylindrical projection 34 is 1.4 to 1.5 mm.

Figure 6:
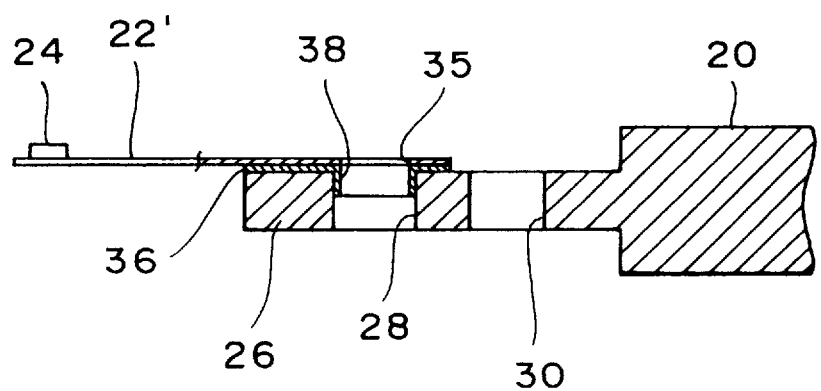
FIG. 6 is a sectional view of a second preferred embodiment of the present invention.

Referring to FIG. 6, there is shown a sectional view of an actuator arm assembly according to a second preferred embodiment of the present invention. In this preferred embodiment, a spacer 36 is spot-welded to a base end portion of a flat suspension 22'. The spacer 36 is formed of stainless steel. The spacer 36 has a cylindrical projection 38 similar to the cylindrical projection 34 in the first preferred embodiment. The flat suspension 22' has a hole 35 having a diameter substantially equal to the inner diameter of the cylindrical projection 38, and the hole 35 of the suspension 22' is substantially aligned to the bore of the cylindrical projection 38. The other configuration of the second preferred embodiment is similar to that of the first preferred embodiment, so the description thereof will be omitted herein to avoid repetition.

Like the first preferred embodiment, the ball 32 is forcibly passed through the hole 30 after inserting the cylindrical projection 38 into the hole 28. Accordingly, the hole 30 is radially expanded to thereby deform the wall portion defining the hole 28. As a result, the cylindrical projection 38 of the spacer 36 is forcibly pressed on the inner surface of the hole 28 of the mounting portion 26, thus fixing the flat suspension 22' to the mounting portion 26 of the actuator arm 20 by crimping of the cylindrical projection 38 of the spacer 36 fixed to the flat suspension 22'.

Figure 7:
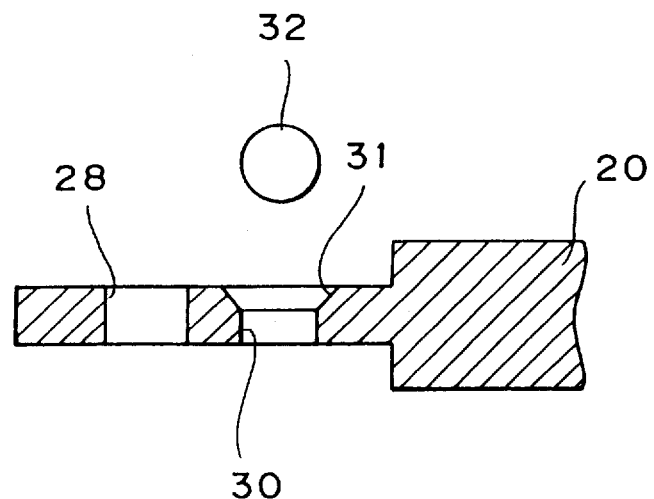
FIG. 7 is a sectional view showing a modification of the hole for passing the ball.

FIG. 7 shows a modification of the ball passing hole 30. In this modification, a conical recess 31 is formed at one end of the hole 30 on the upstream side (upper side) in respect of the direction of passing of the ball 32. The formation of the conical recess 31 facilitates positioning of the ball 32 with respect to the hole 30.

Figure 8:
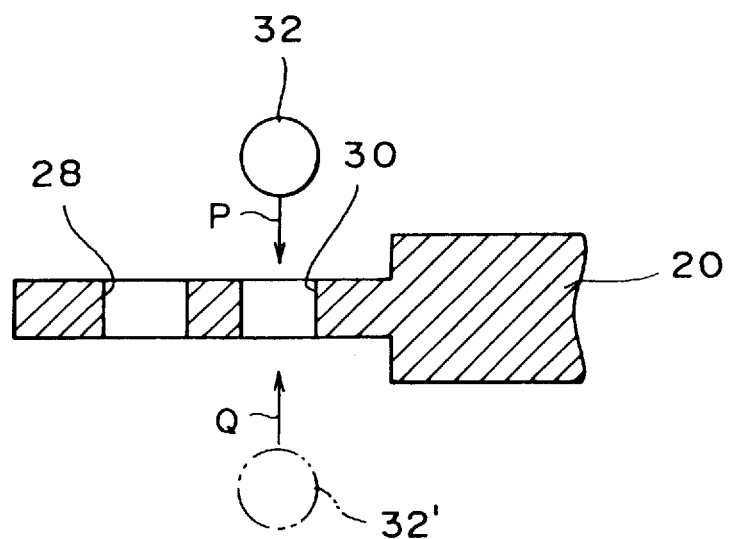
FIG. 8 is a sectional view showing modifications of a method of passing the ball through the hole.

FIG. 8 shows modifications of a method of passing the ball 32 in the crimping work. As a first modification, the ball 32 is first passed through the hole 30 in a forward direction P, and the ball 32 is next passed through the hole 30 in a backward direction Q. As a second modification, the ball 32 is first passed through the hole 30 in the forward direction P, and another ball 32' having a diameter larger than that of the ball 32 is next passed through the hole 30 in the backward direction Q. In this manner, by passing the ball 32 through the hole 30 in the forward direction P and in the backward direction Q once for each direction, or by passing the ball 32 and the ball 32' through the hole 30 respectively in the forward direction P and in the backward direction Q once for each direction, it is possible to suppress recessed and projected deformation of the upper and lower opening edges of the hole 30 occurring on the upstream side and the downstream side in respect of the ball passing direction P.

Figure 9A:
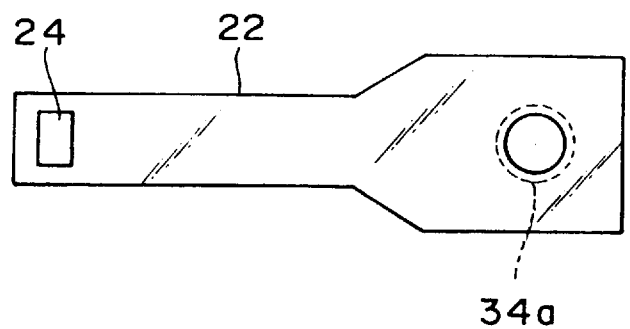
FIG. 9A is a plan view of a modification of a cylindrical projection.
Figure 9B:
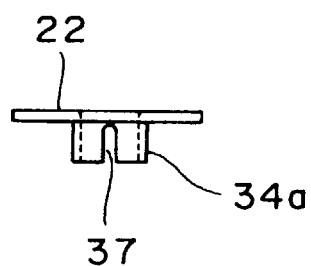
FIG. 9B is a right side view of FIG. 9A.

Referring to FIGS. 9A and 9B, there is shown a modification of the cylindrical projection. In this modification, a cylindrical projection 34a has at least one slit 37 extending in its axial direction. The formation of the slit 37 facilitates deformation of the cylindrical projection 34a or deformation of the wall surface of the wall portion 29 on the hole 28 side. In this case, the difference between the diameter of the suspension positioning hole 28 and the outer diameter of the cylindrical projection 34a is set preferably smaller than the difference between the diameter of the hole 28 and the outer diameter of the cylindrical projection 34 in the first preferred embodiment.

Figure 10A:
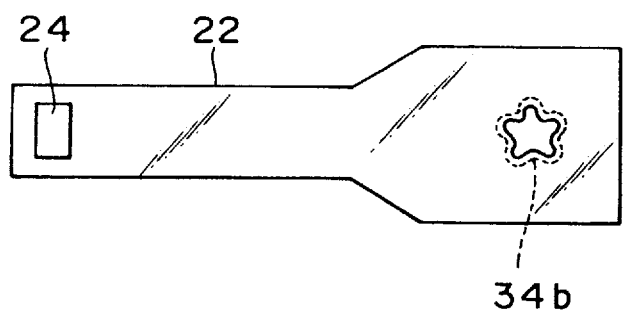
FIG. 10A is a plan view of another modification of the cylindrical projection.
Figure 10B:
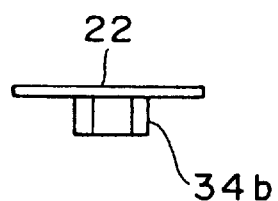
FIG. 10B is a right side view of FIG. 10A.

Referring to FIGS. 10A and 10B, there is shown another modification of the cylindrical projection. In this modification, a cylindrical projection 34b is undulated in the circumferential direction.

Figure 11A:
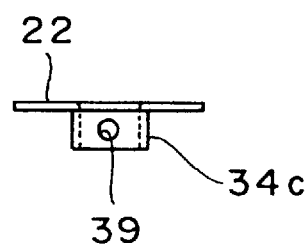
FIGS. 11A and 11B are views similar to FIG. 10B, showing still other modifications of the cylindrical projection.
Figure 11B:
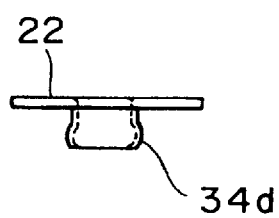

Referring to FIGS. 11A and 11B, there are shown still other modifications of the cylindrical projection. A cylindrical projection 34c shown in FIG. 11A has at least one radial hole 39. A cylindrical projection 34d shown in FIG. 11B is not uniform in its outer diameter in the projecting direction. That is, the cylindrical projection 34d is partially radially expanded.

Figure 12:
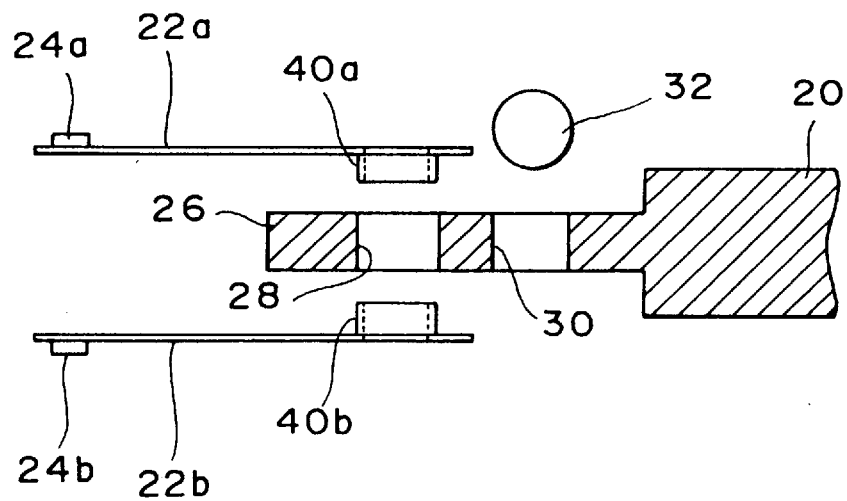
FIG. 12 is a sectional view of a third preferred embodiment of the present invention.

Referring to FIG. 12, there is shown a sectional view of an actuator arm assembly according to a third preferred embodiment of the present invention. In this preferred embodiment, an upper suspension 22a and a lower suspension 22b are mounted on the upper and lower surfaces of the mounting portion 26 of the actuator arm 20, respectively. A semicylindrical projection 40a is formed at a base end portion of the upper suspension 22a, and an upper head 24a is mounted on a front end portion of the upper suspension 22a. Similarly, a semicylindrical projection 40b is formed at a base end portion of the lower suspension 22b, and a lower head 24b is mounted on a front end portion of the lower suspension 22b.

Figure 13:
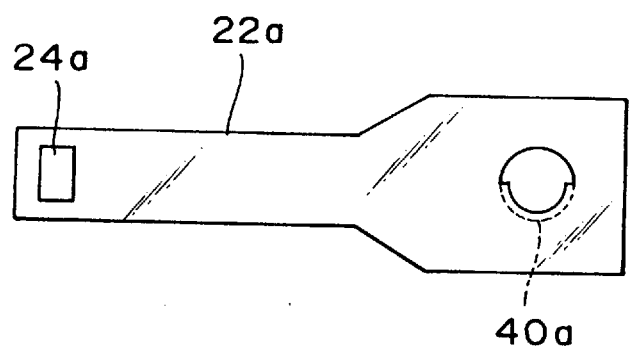
FIG. 13 is a plan view of a suspension used in the third preferred embodiment.

Referring to FIG. 13, there is shown a plan view of the upper suspension 22a. The lower suspension 22b has the same shape as that of the upper suspension 22a. The semicylindrical projection 40a of the upper suspension 22a is inserted into the hole 28 from the upper side of the mounting portion 26. The semicylindrical projection 40b of the lower suspension 22b is inserted into the hole 28 from the lower side of the mounting portion 26 in such a position that the lower suspension 22b is inverted 180 degrees with respect to the upper suspension 22a.

In this manner, the position of the semicylindrical projection 40b of the lower suspension 22b is inverted 180 degrees with respect to the position of the semicylindrical projection 40a of the upper suspension 22a in the hole 28. Accordingly, the two semicylindrical projection 40a and 40b can be deeply inserted into the hole 28 without interference with each other. After inserting the semicylindrical projections 40a and 40b of the upper and lower suspensions 22a and 22b into the hole 28, the ball 32 is forcibly passed through the hole 30 to thereby crimp the semicylindrical projections 40a and 40b of the upper and lower suspensions 22a and 22b in the hole 28.

Figure 14:
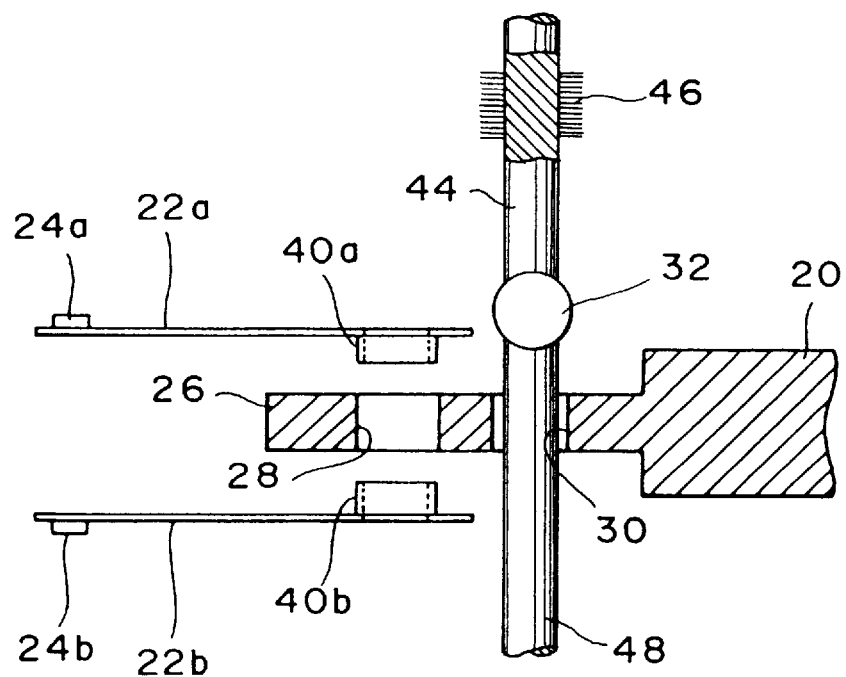
FIG. 14 is a sectional view of a fourth preferred embodiment of the present invention.

Referring to FIG. 14, there is shown a sectional view of a fourth preferred embodiment of the present invention. In this preferred embodiment, the ball 32 is held by an upper rod 44 for pushing the ball 32 and a lower rod 48 for supporting the ball 32. In passing the ball 32 through the hole 30, the upper rod 44 is lowered to push the ball 32 supported by the lower rod 48 to thereby forcibly pass the ball 32 through the hole 30. Further, a brush 46 is provided on the upper rod 44, so as to clean the hole 30 after passing the ball 32 through the hole 30.

Figure 15:
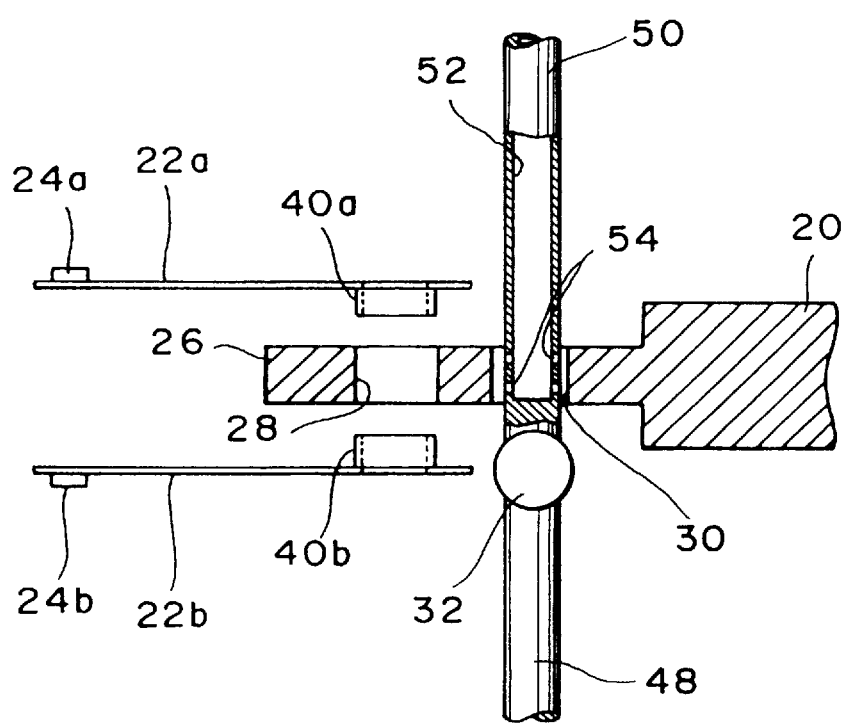
FIG. 15 is a sectional view of a fifth preferred embodiment of the present invention.

Referring to FIG. 15, there is shown a sectional view of a fifth preferred embodiment of the present invention. While this preferred embodiment is similar to the fourth preferred embodiment shown in FIG. 14, an upper rod 50 for pushing the ball 32 is different in structure from the upper rod 44 shown in FIG. 14. The upper rod 50 has a bore 52 communicating with a compressed air source or a blower (not shown) and a plurality of nozzles 54 communicating with the bore 52. After passing the ball 32 through the hole 30, pressurized air is discharged from the nozzles 54 to thereby clean the hole 30. Alternatively, air may be sucked from the nozzles 54 to clean the hole 30.

Figure 16:
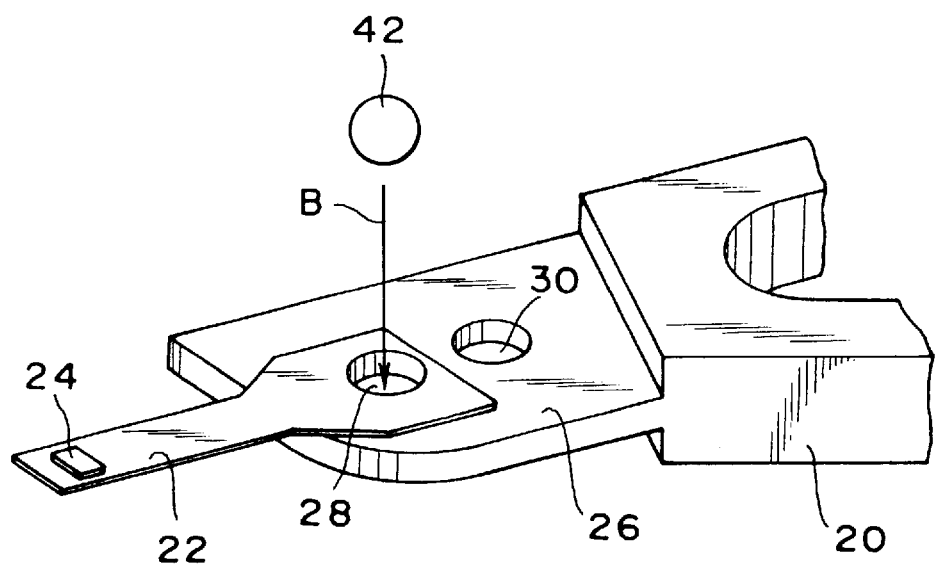
FIG. 16 is a perspective view illustrating a method of removing a suspension.

A method of removing the suspension 22 fixed to the mounting portion 26 of the actuator arm 20 by the above method of the first preferred embodiment will now be described with reference to FIG. 16. In the event of failure of the suspension 22 and/or the head 24, it is necessary to remove the suspension 22 from the actuator arm 20 and then replace the suspension 22 with a new suspension.

In this case, a ball 42 is forcibly passed through the bore of the cylindrical projection 34 of the suspension 22 and through the hole 28 in a direction depicted by an arrow B. Accordingly, the deformation of the hole 28 can be relaxed to allow easy removal of the suspension 22 from the actuator arm 20. Also in removing the suspension 22' with the spacer 36 in the second preferred embodiment and the upper and lower suspensions 22a and 22b in the third preferred embodiment, a similar removing method can be applied.

According to the present invention as described above, twisting and warping of the suspension can be suppressed to allow a uniform mount height of the suspension. Accordingly, fluctuations in flying height of the head can be suppressed. Further, since the two holes are formed directly through the mounting portion of the actuator arm, the accuracy of these holes can be easily ensured to reduce variations in crimping force.

What is claimed is:

1. A method of fixing a suspension to an actuator arm, comprising the steps of:

preparing a mounting portion of said actuator arm, said mounting portion having a first hole and a second hole formed in proximity to said first hole;

preparing a base end portion of said suspension, said base end portion having a cylindrical projection insertable into said first hole;

inserting said cylindrical projection into said first hole; and passing a first ball having a diameter larger than a diameter of said second hole through said second hole in a first direction to radially expand said second hole, thereby deforming a wall portion defining said first hole to forcibly press said cylindrical projection on said mounting portion.

2. A method according to claim 1, wherein a wall portion between said first hole and said second hole has a thickness larger than a difference between said diameter of said first ball and said diameter of said second hole.

3. A method according to claim 1, wherein said mounting portion further has a conical recess formed at one end of said second hole on an upstream side in respect of said first direction of passing of said first ball.

4. A method according to claim 1, further comprising the step of passing a second ball having a diameter larger than the diameter of said first ball through said second hole in a second direction opposite to said first direction of passing of said first ball after passing said first ball through said second hole in said first direction.

5. A method according to claim 1, further comprising the step of passing said first ball through said second hole in a second direction opposite to said first direction of passing of said first ball after passing said first ball through said second hole in said first direction.

6. A method according to claim 1, wherein said cylindrical projection has at least one slit extending in an axial direction of said cylindrical projection.

7. A method according to claim 1, wherein said cylindrical projection has at least one radial hole.

8. A method according to claim 1, wherein said cylindrical projection is undulated in its circumferential direction.

9. A method of fixing a suspension to an actuator arm, comprising the steps of:

preparing a mounting portion of said actuator arm, said mounting portion having a first hole and a second hole formed in proximity to said first hole;

preparing a spacer fixed to a base end portion of said suspension, said spacer having a cylindrical projection insertable into said first hole;

inserting said cylindrical projection into said first hole; and passing a ball having a diameter larger than a diameter of said second hole through said second hole to radially expand said second hole, thereby deforming a wall portion defining said first hole to forcibly press said cylindrical projection on said mounting portion.

10. A method of fixing an upper suspension and a lower suspension to an actuator arm, comprising the steps of:

preparing a mounting portion of said actuator arm, said mounting portion having a first hole and a second hole formed in proximity to said first hole;

preparing a base end portion of said upper suspension, said base end portion of said upper suspension having an upper cylindrical projection insertable into said first hole;

preparing a base end portion of said lower suspension, said base end portion of said lower suspension having a lower cylindrical projection insertable into said first hole;

inserting said upper and lower cylindrical projections into said first hole from upper and lower sides of said mounting portion, respectively; and passing a ball having a diameter larger than a diameter of said second hole through said second hole to radially expand said second hole, thereby deforming a wall portion defining said first hole to forcibly press said upper and lower cylindrical projections on said mounting portion.

11. A method according to claim 10, wherein each of said upper and lower cylindrical projections of said upper and lower suspensions has a semicircular cross section, and said upper and lower cylindrical projections are deeply inserted into said first hole from the upper and lower sides of said mounting portion without interference with each other.

12. A method of fixing an upper suspension and a lower suspension to an actuator arm, comprising the steps of:

preparing a mounting portion of said actuator arm, said mounting portion having a first hole and a second hole formed in proximity to said first hole;

preparing an upper spacer fixed to a base end portion of said upper suspension, said upper spacer having an upper cylindrical projection insertable into said first hole;

preparing a lower spacer fixed to a base end portion of said lower suspension, said lower spacer having a lower cylindrical projection insertable into said first hole;

inserting said upper and lower cylindrical projections into said first hole from upper and lower sides of said mounting portion, respectively; and passing a ball having a diameter larger than a diameter of said second hole through said second hole to radially expand said second hole, thereby deforming a wall portion defining said first hole to forcibly press said upper and lower cylindrical projections on said mounting portion.

13. A method according to claim 10, wherein said step of passing said ball through said second hole comprises the step of pushing said ball by using a push rod having a brush, said method further comprising the step of cleaning said second hole by using said brush after passing said ball through said second hole.

14. A method according to claim 10, wherein said step of passing said ball through said second hole comprises the step of pushing said ball by using a push rod having an air discharging nozzle, said method further comprising the step of cleaning said second hole by discharging air from said air discharging nozzle after passing said ball through said second hole.

* * * * *